United States Patent
Chen et al.

(10) Patent No.: US 10,055,722 B1
(45) Date of Patent: Aug. 21, 2018

(54) TRANSITIONING POINT-OF-SALE DEVICES BETWEEN MODES

(71) Applicant: Square, Inc., San Francisco, CA (US)

(72) Inventors: Grace Huey Chen, San Francisco, CA (US); Christopher Lang Mocko, San Francisco, CA (US); Michael Wells White, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 569 days.

(21) Appl. No.: 14/284,125

(22) Filed: May 21, 2014

(51) Int. Cl.
*G06Q 20/00* (2012.01)
*G06Q 20/20* (2012.01)

(52) U.S. Cl.
CPC ................ *G06Q 20/202* (2013.01)

(58) Field of Classification Search
CPC ................ G06Q 20/20; G07G 1/12
USPC ................................ 705/15–16
See application file for complete search history.

*Primary Examiner* — Ramsey Refai
(74) *Attorney, Agent, or Firm* — Lee & Hayes, PLLC

(57) ABSTRACT

Techniques and arrangements for transitioning point-of-sale (POS) devices between online and offline modes. In some instances, the techniques instruct a POS device to transition from an online mode to an offline mode based on a volume of transactions on the POS device within a certain time period, based on an increase in the rate of transactions occurring on the POS device, or based on anticipating a rise in the number of transactions on the POS device for other reasons.

22 Claims, 4 Drawing Sheets

TRANSITIONING POINT-OF-SALE DEVICES BETWEEN MODES

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor.

In some instances, these mobile POS devices are configured to operated in either an online mode or offline mode. Because of the mobile nature of these POS devices, the POS devices may sometimes lack network connectivity and, hence, may transition from the online mode to the offline mode.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
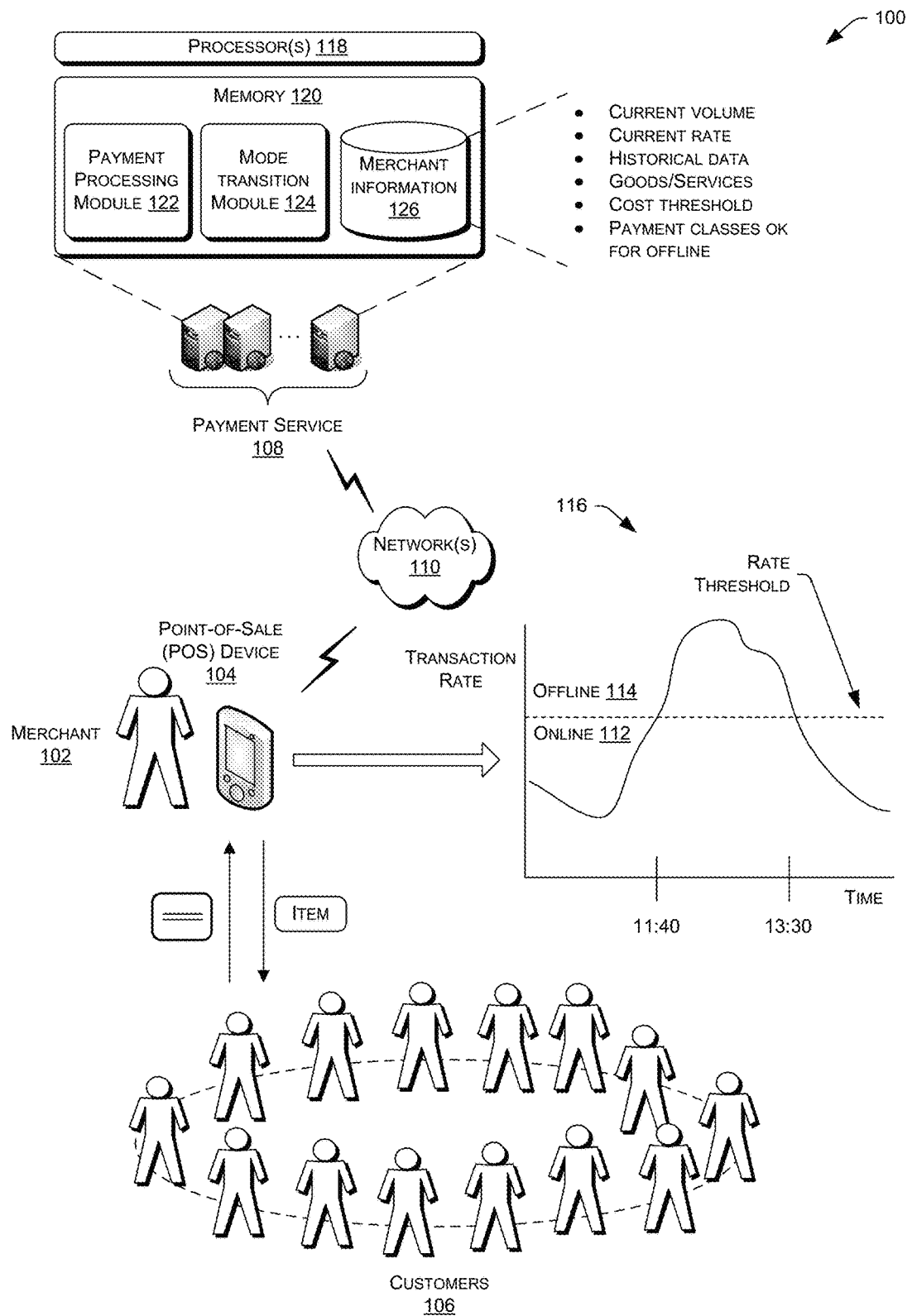
FIG. 1 illustrates an example environment that includes a merchant operating a mobile point-of-sale (POS) device to conduct transactions with multiple different customers. In some instances, the POS device may transition from an online mode, in which the POS device uploads payment information to a payment service substantially immediately after receiving the payment information from a customer, to an offline mode, in which the POS device locally stores the payment information for later uploading, based on an increase in transactions at the POS device.

Some implementations described herein include techniques and arrangements for transitioning point-of-sale (POS) devices between online and offline modes. In some instances, the techniques instruct a POS device to transition from an online mode to an offline mode based on a volume of transactions on the POS device within a certain time period, based on an increase in the rate of transactions occurring on the POS device, or based on anticipating a rise in the number of transactions on the POS device for other reasons.

To conduct a transaction, a merchant may receive a payment instrument from a customer to pay for a good or service that the customer receives from the merchant. The merchant may then input an identifier associated with the payment instrument into a POS device by, for example, swiping the payment instrument, typing in a number of the payment instrument, or the like. When the POS device is operating in an online mode, the POS device sends information regarding identifier of the payment instrument to a payment service for authorization of the payment instrument. In some instances, the POS device sends this information to the payment instrument substantially contemporaneously with the POS device receiving the identifier of the payment instrument. Usually after a short delay, the POS device may receive an indication of whether the payment instrument has been approved or declined for an amount of the transaction (i.e., a cost of the good or service). However, this "authorization delay" may increase based on certain factors, such as an increase in network latency or a slowdown in the authorization process at a payment service. These delays may be unacceptable during certain peak hours at the merchant (e.g., when the merchant has a long line and wishes to avoid customers from having a negative experience due to a long wait).

When the POS device operates in the offline mode, however, the POS device locally stores the information regarding the identifier of the payment instrument for later sending to the payment service after the POS device transitions back into the online mode. POS devices of this nature may transition to this offline mode when the devices lose network connectivity (e.g., due to being at a location that lacks network connectivity) or in response to an operator manually transitioning to the offline mode using a merchant application executing on the device. In some instances, however, merchants may find it beneficial if the POS device were to automatically transition between the modes based on factors other than network connectivity.

As such, the techniques described herein may configure a POS device to automatically (i.e., without user input) transition between modes (e.g., an offline mode and an online mode) based on one or more factors other than network connectivity. For instance, the POS device may be configured to transition from an online mode to an offline mode based on the POS device experiencing or anticipating a significant rise in the number of transactions being processed by the POS device. Because completing an online transaction typically requires more time than an offline transaction, due to the authorization delay described above, a merchant may be able to process transactions more promptly when in the offline mode (although the offline transactions will later need to be authorized). Decreasing an amount of time needed to process a transaction may allow the merchant to increase the number of transactions that the POS device is able to complete over a busy time period.

To illustrate, envision a merchant that operates a take-out restaurant that utilizes one of the POS devices described above. During relatively slow times (e.g., between breakfast and lunch), the merchant may utilize the POS device in online mode. By doing so, the merchant learns in near-real-time (after the authorization delay) whether a payment instrument of the customer has been approved. If the payment instrument is declined, then the merchant may request another form of payment.

When the merchant encounters a busy time period such as lunch, however, the merchant may encounter a sharp increase in the number of transactions that the POS device needs to process. For instance, a line of people requesting food from the merchant may develop. The POS device may be configured to transition to the offline mode in this instance, thereby allowing the merchant to decrease the amount of time between transactions and decrease the amount of time needed for the merchant to work through the line. This may result in happier customers, thus increasing the chance that the customers return to the merchant. After lunch passes, meanwhile, the POS device may be configured to transition back to the online mode, at which point the POS device may upload the payment information to the payment service for authorization of the numerous payment instruments received during the lunch hour.

As described below, the POS device (or another entity) may be configured to transition the POS device from the online mode to the offline mode (or vice versa) in a number of ways. For instance, the POS device or the other entity may measure a volume of transactions that the POS device processes over a given time period. If that volume exceeds a threshold, then the POS device may transition to the offline mode. In another example, the POS device or the other entity may determine that the POS device is experiencing an increase in a rate of transactions occurring at the POS device. In response to determining that this rate is greater than a rate threshold, the POS device may transition to the offline mode, or provide an option to the user to switch to the offline mode. For instance, the POS device may surface a menu asking the user if he or she would like to transition wholly or partly to the offline mode (based on the expected rise in transactions). In still another example, the POS device may anticipate a rise based on historical data, such as historical sales volume at the merchant at certain times of day.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 that includes a merchant 102 operating a point-of-sale (POS) device 104 to engage in various transactions respective customers 106. The POS device 104 may comprise any sort of mobile or non-mobile device that includes an instance of a merchant application that executes on the respective device. The merchant application may provide POS functionality to the POS device 104 to enable the merchant 102 (e.g., an owner, employees, etc.) to accept payments from the customers 106. In some types of businesses, the POS device 104 may correspond to a store or other place of business of the merchant, and thus, may be a fixed location that typically does not change on a day-to-day basis. In other types of businesses, however, the POS device 104 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104 to process the transaction, such as by inputting (e.g., manually, via a magnetic card reader or an RFID reader, etc.) an identifier associated with the payment instrument. For example, a payment instrument of one of the customers 106 may include one or more magnetic strips for providing card and customer information when swiped in a card reader. In other examples, other types of payment cards may be used, such as smart cards having a built-in memory chip, a radiofrequency identification tag, or so forth.

During the transaction, the POS device 104 can determine transaction information describing the transaction, such as the identifier of the payment instrument, an amount of payment received from the customer, the item(s) acquired by the customer, a time, place and date of the transaction, and so forth. The POS device 104 can send the transaction information to a payment service 108 over a network 110, either substantially contemporaneously with the conducting of the transaction (in the case of online transactions) or later when the device 104 is in the online mode (in the case offline transactions).

In an offline transaction, the POS device 104 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers 106, the POS device 104 may provide the stored information to the payment service 108 over the network 110. The network 110 may represent any one or more wired or wireless networks, such as a WiFi network, a cellular network, or the like.

As introduced above and as FIG. 1 illustrates, the POS device 104 may be configured to automatically transition between the online mode and the offline mode based on an array of different reasons other than simply a loss of network connectivity. For instance, the POS device 104 may transition to the offline mode in order to increase an efficiency of transactions conducted between the merchant 102 and the customers 106. The POS device 104 may make this transition in response to a rate in an increase in sales volume being greater than a threshold, in response to an amount of transactions over a given time period being greater than a threshold, in response to anticipating an increase in future transactions (e.g., based on historical sales data), or the like. In some instances, the POS device 104 may provide an option to the user to transition to the offline mode, rather than automatically transition to the offline mode.

FIG. 1 illustrates a graph 116 that pictorially indicates the POS device 104 transitioning between an online mode 112 and an offline mode 114 based on a transaction rate. As illustrated, the POS device 104 is configured with a rate threshold, under which the POS device 104 in this example will operate in the online mode 112. That is, when the rate of transactions occurring at a given time is relatively low (i.e., less than the rate threshold), then POS device 104 may "have time" to process each transaction online. When, however, the transaction rate is greater than the rate threshold, then the POS device 104 may transition to the offline mode 114) and process subsequent transactions in the offline mode 114 (until the rate again becomes less than the rate threshold). That is, when the transaction rate becomes relatively great (i.e., greater than the rate threshold), then the POS device 104 might not have time to wait to for the authorization delay associated with an online transaction. Doing so may result in an unacceptable delay to the customers 106 (as determined by the merchant 102), which might result in a loss of customers. In some instances, the merchant 102 may define a value of the rate threshold.

In the illustrated example, the transaction rate increases to a value greater than the rate threshold approximately during a lunch hour. As one might expect for a merchant that offers food, the line at this point may be quite long and, therefore, transactions may be occurring at a relatively high rate. As discussed in further detail below, in some instances the POS device 104 or the payment service 108 may identify these historical trends and may anticipatorily transition to the offline mode 114 rather than waiting for the transaction rate to increase beyond the threshold.

As illustrated, the payment service 108 may include one or more processors 118 and memory 120, which may store a payment processing module 122, a mode transition module 124, and merchant information 126 corresponding to respective merchants. The payment processing module 122 may function to receive the information regarding a transaction from the POS device 104 and attempt to authorize the payment instrument used to conduct the transaction. The payment processing module 122 may then send an indication of whether the payment instrument has been approved or declined back to the POS device 104.

Generally, when a customer and a merchant enter into an electronic payment transaction, the transaction is processed by electronically transferring funds from a financial account associated with the customer to a financial account associated with the merchant. As such, the payment processing module 122 may communicate with one or more computing devices of a card payment network, e.g., MasterCard®, VISA®, over the network 110 to conduct financial transactions electronically. The payment processing module 122 can also communicate with one or more computing devices of one or more banks over the network 110. For example, the payment processing module 122 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

As illustrated, the merchant information 126 may include a current volume of transactions at the POS device (e.g., within the last 10 minutes, hour, etc.), a current rate at which the POS device 104 is processing transactions, historical data (e.g., sales at certain times of days, days of the week, etc.), a class of goods or services offered by the merchant, a cost threshold (e.g., set by the merchant 102) above which the POS device is process in an online mode (where network connectivity is available), an indication of which payment-instrument classes the merchant has indicated as being okay to process in the offline mode (and which the merchant would like to process in the online mode where a network connection is available, such as a stored-value (gift) cards), and the like. In some instances, some or all of this information is additionally or alternatively stored locally at the POS device 104

The mode transition module 124 may utilize the merchant information 126 to determine when to instruct the POS device 104 to transition modes, such as when to transition from an online mode to an offline mode and vice versa. While illustrated at the payment service 108, in some implementations a merchant application executing on the POS device 104 (discussed with reference to FIG. 4) may instead or additionally perform some or all of the functionality of the transition module 124.

In some instances, the mode transition module 124 may instruct the POS device 104 to transition modes based on a reported or anticipated increased in a volume of transactions at the POS device 104, as determined by any one or a combination of the information from the merchant information 126. For instance, if a volume of transactions over a prescribed time period is greater than a volume threshold, and/or if the transaction rate is greater than a rate threshold, then the POS device 104 may transition from an online mode to an offline mode. The converse may also be true. In another example, the POS device 104 may transition based on historical data indicating that a volume is expected to increase for a particular time of day and/or on a particular day. In still other instances, the mode transition module 124 may identify merchants that are similar to the merchant 102 (e.g., based on geography, goods or services offered, and/or the like), may analyze historical sales data for these merchants, and may predict how the volume may increase for the merchant 102 based on this information.

In some instances, in response to determining that a volume of transactions has risen or is expected to rise in a future time period, the POS device 104 may increase the amount of transactions processed offline, while still processing some transactions online. For instance, the POS device may begin, at a relatively slow time period for transactions, processing all transactions online. As the volume increases or is expected to increase, the POS may begin processing more and more transactions offline (e.g., 10%, 20%, . . . , 80%, etc.).

In addition or in the alterative, the POS device 104 may process certain transactions "offline" (i.e., in the offline mode) by performing only a portion of an authorization process. For instance, in the example of authorizing a credit card, the payment service 108 may first "authorize" the credit card for the amount of a transaction and may then "capture" the actual funds from a bank associated with the credit card. In some instances, the mode transition module 124 may perform the "authorization" step but may await to perform the "capture" step until a time when the volume or rate of transactions is less.

Figure 2:
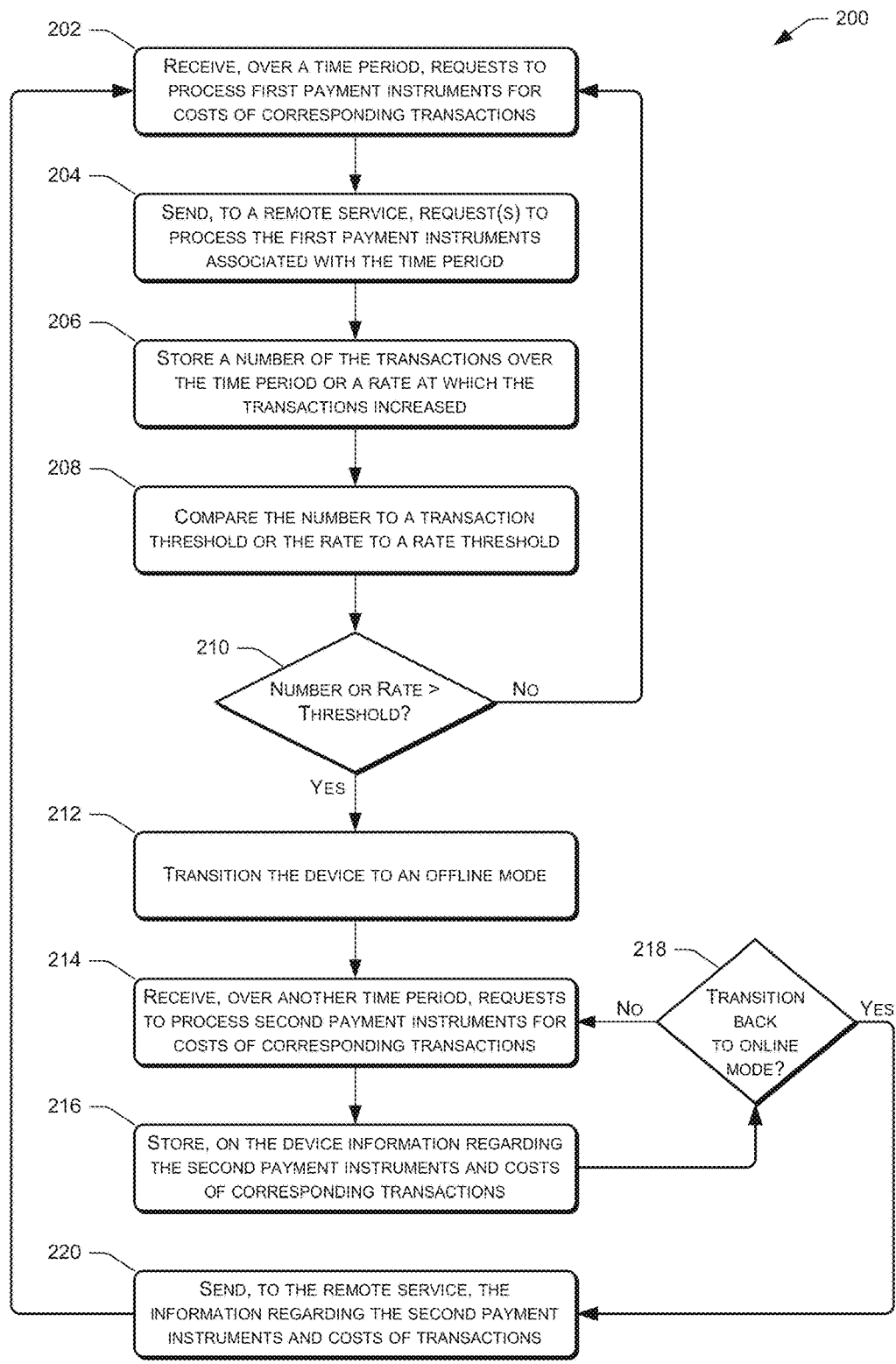
FIG. 2 illustrates a flow diagram of a process for transitioning a POS device between an online mode and an offline mode based at least in part on a volume or rate of transactions occurring on the POS device.

FIG. 2 illustrates a flow diagram of a process 200 for transitioning a POS device between an online mode and an offline mode based at least in part on a volume or rate of transactions occurring on the POS device. The process 200 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 200 may be performed by a POS device, by a remote payment service, by another entity, or by a combination thereof.

At 202, the process 200 receives, over a time period, requests to process first payment instruments for costs of corresponding transactions. For instance, multiple ones of the customers 106 may engage in respective transactions with the merchant 102 using respective payment instruments.

At 204, the process 200 sends, to a remote service such as the payment service 108, one or more requests to process the first payment instruments. At 206, the process stores at least one of a number of the transactions (i.e., a volume) or a rate at which the transactions increased over the time period.

At 208, the process 200 at least one of compares the number of transactions stored at 206 to a transaction threshold or compares the rate at which the transactions increased over the time period to a rate threshold. At 210, the process 200 determines at least one of whether the number of transactions is greater than the transaction threshold or whether the rate is greater than the rate threshold. If not, then the process 200 returns to the operation 202, albeit for a subsequent time period. That is, the process 200 continues to process transactions in the online mode.

If, however, the process 200 does determine, at 210, that the amount of the transactions or the rate increase is greater than the respective threshold, then the process proceeds to operation 212. At 212, the process 200 transitions a POS device from an online mode to an offline mode, or provides an option to the user to transition to the offline mode (wholly or partially), rather than automatically transition to the offline mode. At 214, the process 200 receives, over another time period, requests to process second payment instruments for costs of corresponding transactions. At 216, the process 200 stores at least one of a number of the transactions over the other time period or a rate at which the transactions increased over the other time period.

At 218, the process 200 determines whether to transition back to the online mode. In some instances, this operation may include determining whether the amount of transactions over the other time period is less than a transaction threshold or whether the rate at which the transactions increased over the other time period is less than a rate threshold. These threshold may be the same thresholds or different threshold as those discussed above with respect to the operation 210.

If the process 200 determines to transition back to the online mode (e.g., because the volume or rate of transactions has "slowed"), then the process 200 may return to the operation 202. If not, however, then the process 200 returns to the operation 214, albeit for yet another time period. That is, the process 200 remains in the offline mode.

Figure 3:
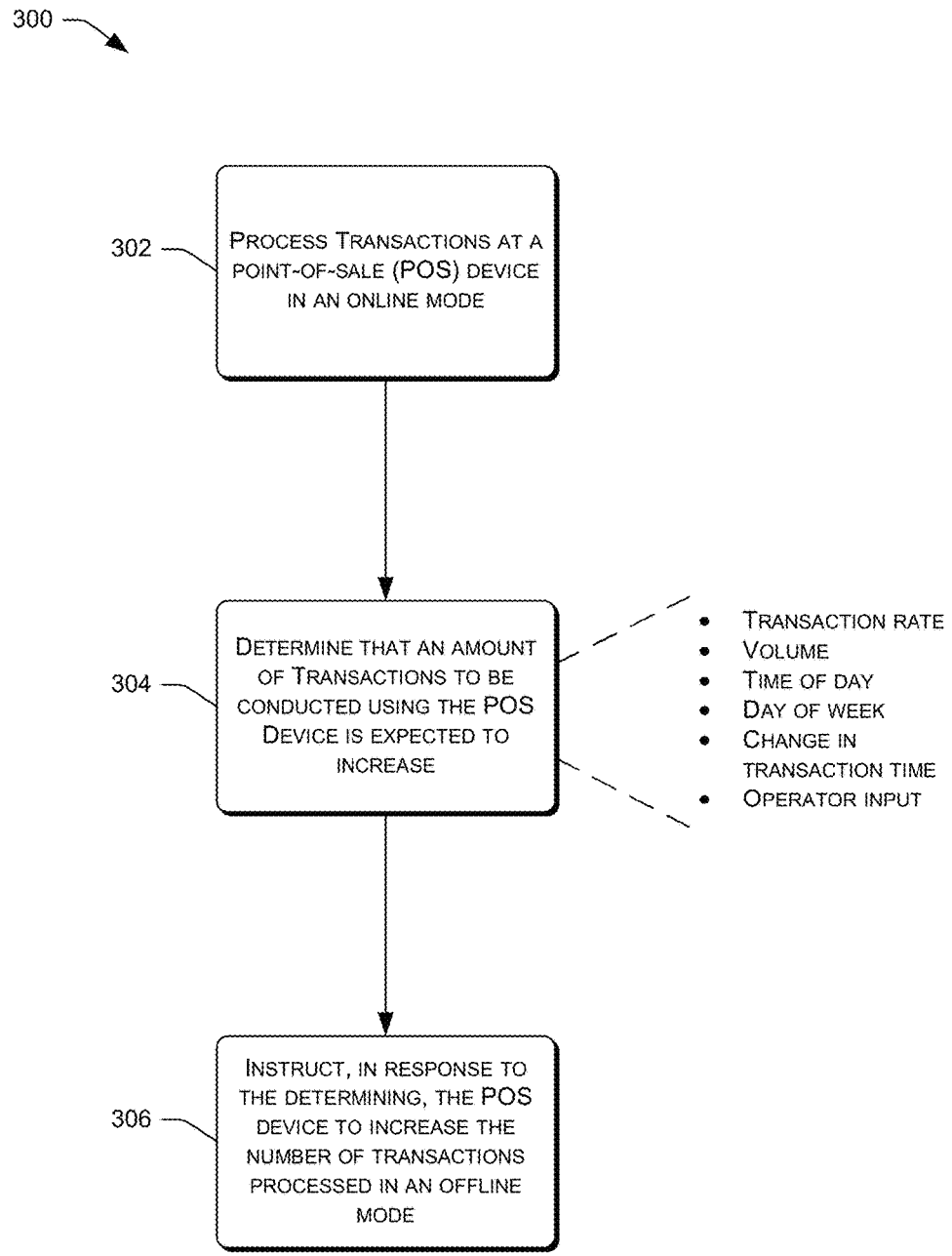
FIG. 3 illustrates a flow diagram of a process for determining that an amount of transactions conducted on a POS device is expected to increase and, in response, instructing the POS device to transition from an online mode to an offline mode.

FIG. 3 illustrates a flow diagram of a process 300 for determining that an amount of transactions conducted on a POS device is expected to increase and, in response, instructing the POS device to transition from an online mode to an offline mode. Again, the POS device, the payment service, another entity, or a combination thereof may perform the process 300.

At 302, the process 300 processes transactions at the POS device in an online mode. While doing so, the process may store information regarding the volume or increases/decreases in rate of transactions processed at the POS device.

At 304, the process 300 determines that an amount of transactions to be conducted at the POS is expected to rise. The process 300 may make this determination with reference to a number of transactions recently conducted at the POS device, a change in the rate of transactions (e.g., a sharp increase in the number of transactions), based on a time of day and historical sales at the time of day, or based on a day of the week and historical sales on the day of the week. In another example, the process 300 additionally or alternatively makes this determination with reference to a change in an amount of time between transactions or a change in an amount of inputs of an operator during a transaction. That is, less time between transactions or less time between inputs on a single transaction (and, hence, shorter individual transaction times) may indicate that a merchant is "experiencing a rush" or is otherwise busy. That is, this data may indicate that the merchant is quickly processing transactions. In yet another example, the merchant application operating on the POS device may present a user interface (UI) allowing the merchant herself to provide an input indicating that she is "busy" and would like to transition to the offline mode.

In response to making this determination, at 306, the process 300 may instruct the POS device to increase the number of transactions subsequently processed in an offline mode, or provide an option to the user to do so. That is, a larger percentage or all of the subsequent transactions may be processed in the offline mode, at least until the process 300 determines to instruct the POS device to decrease the amount of transactions processed in the offline mode.

Figure 4:
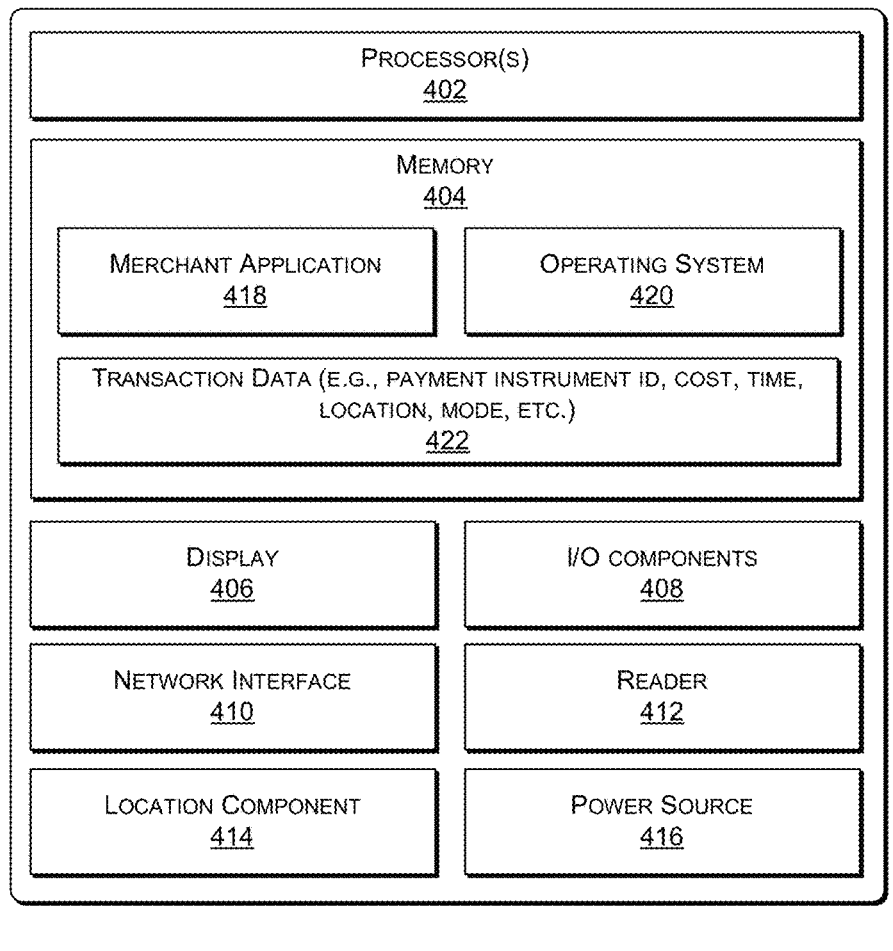
FIG. 4 illustrates select components of a POS device that a merchant described herein may utilize.

FIG. 4 illustrates select example components of an example POS device 400 according to some implementations. The POS device 400 may be any suitable type of computing device, e.g., mobile, semi-mobile, semi-stationary, or stationary. Some examples of the POS device 400 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 400 includes at least one processor 402, memory 404, a display 406, one or more input/output (I/O) components 408, one or more network interfaces 410, at least one card reader 412, at least one location component 414, and at least one power source 416. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the memory 404.

Depending on the configuration of the POS device 400, the memory 404 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 404 may include, but is not limited to, RAM, ROM, EEPROM, flash memory, solid-state storage, magnetic disk storage, optical storage, and/or other computer-readable media technology. Further, in some cases, the POS device 400 may access external storage, such as RAID storage systems, storage arrays, network attached storage, storage area networks, cloud storage, or any other medium that can be used to store information and that can be accessed by the processor 402 directly or through another computing device or network. Accordingly, the memory 404 may be computer storage media able to store instructions, modules or components that may be executed by the processor 402. Further, when mentioned, non-transitory computer-readable media exclude media such as energy, carrier signals, electromagnetic waves, and signals per se.

The memory 404 may be used to store and maintain any number of functional components that are executable by the processor 402. In some implementations, these functional components comprise instructions or programs that are executable by the processor 402 and that, when executed, implement operational logic for performing the actions and services attributed above to the POS device 400. Functional components of the POS device 400 stored in the memory 404 may include a merchant application 418, discussed above. The merchant application 418 may present an interface on the POS device 400 to enable the merchant to conduct transactions, receive payments, and so forth, as well as communicating with the payment service 102 for processing payments and sending transaction information. Further, the merchant application 418 may present an interface to enable the merchant to manage the merchant's account, and the like. The merchant application 418 may also include some or all of the functionality described above with reference to the mode transition module 124. Additional functional components may include an operating system 420 for controlling and managing various functions of the POS device 400 and for enabling basic user interactions with the POS device 400. The memory 404 may also store transaction data 422 that is received based on the merchant associated with the POS device 400 engaging in various transactions with customers, such as the example customers 106 from FIG. 1.

In addition, the memory 404 may also store data, data structures and the like, that are used by the functional components. For example, this data may include item information that includes information about the items offered by the merchant, which may include images of the items, descriptions of the items, prices of the items, and so forth. Depending on the type of the POS device 400, the memory 404 may also optionally include other functional components and data, which may include programs, drivers, etc., and the data used or generated by the functional components. Further, the POS device 400 may include many other logical, programmatic and physical components, of which those described are merely examples that are related to the discussion herein.

The network interface(s) 410 may include one or more interfaces and hardware components for enabling communication with various other devices over the network or directly. For example, network interface(s) 410 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the POS device 400 may include the display 406 mentioned above. Depending on the type of computing device used as the POS device 400, the display 406 may employ any suitable display technology. For example, the display 406 may be a liquid crystal display, a plasma display, a light emitting diode display, an OLED (organic light-emitting diode) display, an electronic paper display, or any other suitable type of display able to present digital content thereon. In some examples, the display 406 may have a touch sensor associated with the display 406 to provide a touchscreen display configured to receive touch inputs for enabling interaction with a graphic interface presented on the display 406. Accordingly, implementations herein are not limited to any particular display technology. Alternatively, in some examples, the POS device 400 may not include the display 406, and information may be present by other means, such as aurally.

The I/O components 408, meanwhile, may include speakers, a microphone, a camera, and various user controls (e.g., buttons, a joystick, a keyboard, a keypad, etc.), a haptic output device, and so forth.

In addition, the POS device 400 may include or may be connectable to a payment instrument reader 412. In some examples, the reader 412 may plug in to a port in the merchant device, such as a microphone/headphone port, a data port, or other suitable port. In other instances, the reader 412 is integral with the entire POS device 400. The reader may include a read head for reading a magnetic strip of a payment card, and further may include encryption technology for encrypting the information read from the magnetic strip. Alternatively, numerous other types of card readers may be employed with the POS devices 400 herein, depending on the type and configuration of a particular POS device 400.

The location component 414 may include a GPS device able to indicate location information, or the location component 414 may comprise another other location-based sensor. The POS device 400 may also include one or more additional sensors (not shown), such as an accelerometer, gyroscope, compass, proximity sensor, and the like. Additionally, the POS device 400 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A point-of-sale (POS) device configured to automatically switch between operating in an online mode and an offline mode to increase a number of transactions that the POS device is able to execute over a given time period, the POS device comprising:
   a payment instrument reader;
   one or more processors, in communication with the payment instrument reader; and
   one or more computer-readable media storing instructions executable by the one or more processors, wherein the instructions program the one or more processors to:
      receive, using the payment instrument reader and during a first time period, payment information associated with first payment instruments that are used to satisfy costs of corresponding transactions;
      send, to a remote service, one or more requests to authorize the first payment instruments for the costs of the corresponding transactions of the first time period;
      store an indication of at least one of: a number of the transactions of the first time period, or a rate at which the transactions of the first time period increased over the first time period;
      compare, based at least in part on the indication, at least one of: the total number of the transactions of the first time period to a transaction threshold, or the rate at which the transactions of the first time period increased over the first time period to a rate threshold;
      determine: (i) that a latency associated with a request to process a payment instrument made during the first time period exceeds a latency threshold, and (ii) at least one of: that the total number of transactions is greater than the transaction threshold, or that the rate at which the transactions of the first time period increased over the first time period is greater than the rate threshold;
      transition, at least partly in response to the determining and to decrease an amount of time to process subsequent transactions at the POS device, the POS device from the online mode in which the POS device sends information regarding payment instruments to the remote service to the offline mode in which the POS devices locally stores information regarding payment instruments for sending to the remote service at a later time after the POS device transitions back to the online mode;
      receive, using the payment instrument reader and during a second time period that is subsequent to the first time period, payment information associated with second payment instruments that are used to satisfy costs of corresponding transactions; and
      store, at the POS device, information regarding the second payment instruments and the costs of the transactions of the second time period for processing after the POS device transitions back to the online mode.

2. A POS device as recited in claim 1, wherein the instructions further program the one or more processors to:
   determine that a time between a first request to process a payment instrument made during the first time period and a second request to process a payment instrument made during the first time period is less than a time threshold; and
   wherein the transitioning also occurs at least partly in response to determining that the time between the first and second requests is less than the time threshold.

3. A point-of-sale (POS) device configured to automatically switch between operating in an online mode and an offline mode to increase an amount of transactions that the POS device is able to execute over a given time period, the POS device comprising:
   a payment instrument reader;
   one or more processors; and
   one or more computer-readable media storing computer-executable instructions that, when executed, cause the one or more processors to perform acts comprising:
      receiving, using the payment instrument reader and during a first time period, payment information associated with a payment instrument;
      determining that a latency associated with a request to process the payment instrument at the POS device exceeds a latency threshold;
      determining that an amount of transactions to be conducted using the POS device is expected to rise over a future time period that is at least partly subsequent to the first time period; and
      at least partly in response to: (i) the determining that the latency exceeds the latency threshold, and (ii) the determining that the amount of transactions is expected to rise, instructing the POS device to increase a number of the transactions conducted during the future time period while the POS device is in the offline mode to increase the amount of transactions that the POS device is able to execute during the future time period,
      wherein a transaction executed in the offline mode takes less time than a transaction executed in the online mode, and wherein the transaction executed in the offline mode is processed based at least in part on the POS device switching to the online mode.

4. A POS device as recited in claim 3, wherein conducting a transaction in the offline mode comprises storing, at the POS device, information regarding a payment instrument used to satisfy a cost of the transaction, and wherein processing the transaction in the online mode comprises uploading, to a remote service, the information for authorization of the payment instrument used to satisfy the cost of the transaction.

5. A POS device as recited in claim 3, wherein conducting a transaction in the offline mode comprises authorizing, at a remote service, a payment instrument used to satisfy a cost of the transaction but refraining from capturing funds associated with the cost of the transaction until a later time.

6. A POS device as recited in claim 3, the acts further comprising:
   determining a rate at which transactions conducted using the POS device increased over a previous time period; and
   wherein the determining that the amount of transactions conducted using the POS device is expected to rise over the future time period is based least in part on determining that the rate has increase over the previous time period.

7. A POS device as recited in claim 3, the acts further comprising:
   determining a time of day;
   determining that transactions conducted using the POS device have historically increased after the time of day; and
   wherein the determining that the amount of transactions conducted using the POS device is expected to rise over the future time period is based least in part on determining that the transactions conducted using the POS device have historically increased after the time of day.

8. A POS device as recited in claim 3, wherein the POS device is associated with a first merchant that offers a particular good or service, and the acts further comprising:
  determining a time of day;
  determining that transactions conducted using a POS device associated with a second merchant have historically increased after the time of day, the second merchant having been determined to offer a good or service that is similar to the particular good or service; and
  wherein the determining that the amount of transactions conducted using the POS device is expected to rise over the future time period is based least in part on determining that the transactions conducted using the POS device associated with the second merchant have historically increased after the time of day.

9. A POS device as recited in claim 3, wherein the POS device is associated with a first merchant located at a particular geographical location, and the acts further comprising:
  determining a time of day;
  determining that transactions conducted using a POS device associated with a second merchant have historically increased after the time of day, the second merchant being located within a threshold distance of the particular geographical location; and
  wherein the determining that the amount of transactions conducted using the POS device is expected to rise over the future time period is based least in part on determining that the transactions conducted using the POS device associated with the second merchant have historically increased after the time of day.

10. A POS device as recited in claim 3, the acts further comprising:
  determining that a time between transactions made on the POS device has decreased; and
  wherein the determining that the amount of transactions conducted using the POS device is expected to rise over the future time period is based least in part on determining that the time between transactions has decreased.

11. A POS device as recited in claim 3, the acts further comprising:
  receiving an input from an operator of the POS device, the input indicating that the amount of transactions conducted using the POS device is expected to rise over the future time period; and
  wherein the determining that the amount of transactions conducted using the POS device is expected to rise over the future time period is based least in part on receiving the input.

12. A POS device as recited in claim 3, wherein the instructing further comprises instructing the POS device to transition from the online mode to the offline mode such that each subsequent transaction is processed offline.

13. A POS device as recited in claim 3, wherein the instructing comprises instructing the POS device to increase a percentage of subsequent transactions conducted in the offline mode and decrease a percentage of subsequent transactions conducted in the online mode.

14. A POS device as recited in claim 3, wherein the instructing comprises instructing the POS device to: (1) conduct subsequent transactions having costs that are lower than a cost threshold in the offline mode, and (2) conduct subsequent transactions having costs that are higher than the cost threshold in the online mode.

15. A point-of-sale (POS) device configured to automatically switch between operating in an online mode and an offline mode to increase a number of transactions that the POS device is able to execute over a given time period, the POS device, comprising:
  a payment instrument reader;
  one or more processors, in communication with the payment instrument reader; and
  one or more computer-readable media storing instructions executable by the one or more processors, wherein the instructions program the one or more processors to:
    receive, using the payment instrument reader, information regarding a first payment instrument used to satisfy a cost of a first transaction;
    process the first transaction on the POS device in the online mode by sending, to a remote service, the information regarding the first payment instrument used to satisfy the cost of the first transaction;
    transition the POS device from the online mode to the offline mode based at least in part on at least one of a recent volume of transactions on the POS device or an anticipated volume of transactions on the POS device;
    receive, using the payment instrument reader, information regarding a second payment instrument used to satisfy a cost of a second transaction;
    process the second transaction on the POS device in the offline mode by storing, on the POS device, the information regarding the second payment instrument used to satisfy the cost of the second transaction, the second transaction processed in the offline mode taking less time than the first transaction processed in the online mode;
    transitioning the POS device from the offline mode back to the online mode; and
    based at least in part to the POS device transitioning back to the online mode, process the second transaction on the POS device in the online mode by sending, to the remote service, the information regarding the second payment instrument used to satisfy the cost of the second transaction.

16. A POS device as recited in claim 15, wherein the transitioning occurs without an input from an operator of the POS device at a time of the transitioning.

17. A POS device as recited in claim 15, the acts further comprising:
  receiving, after the transitioning, a request to process a third transaction using a payment instrument to satisfy a cost of the third transaction;
  at least partly in response to determining that the cost of the third transaction is less than a cost threshold, processing the third transaction in the offline mode by storing, on the POS device, information regarding the payment instrument used to satisfy the cost of the third transaction; and
  at least partly in response to determining that the cost of the third transaction is greater than or equal to the cost threshold, processing the third transaction in the online mode by sending, to the remote service, the information regarding the payment instrument used to satisfy the cost of the third transaction.

18. A POS device as recited in claim 15, the acts further comprising:
  receiving, after the transitioning, a request to process a third transaction using a payment instrument to satisfy a cost of the third transaction;
  identifying a class of the payment instrument used to satisfy the cost of the third transaction;

determining whether the class of the payment instrument has been designated to be processed in the online mode; and at least partly in response to determining that the class of the payment instrument has been designated to be processed in the online mode, processing the third transaction in the online mode by sending, to the remote service, the information regarding the payment instrument used to satisfy the cost of the third transaction.

19. A POS device as recited in claim 18, wherein the class of the payment instrument used to satisfy the cost of the third transaction comprises a stored-value card.

20. A point-of-sale (POS) device configured to automatically switch between operating in an online mode and an offline mode to increase an amount of transactions that the POS device is able to execute over a given time period, the POS device:

a payment instrument reader;
one or more processors; and
one or more computer-readable media storing computer-executable instructions that, when executed, cause the one or more processors to perform acts comprising:
receiving, using the payment instrument reader and during a first time period, payment information associated with first payment instruments that are used to satisfy costs of corresponding transactions;
determining that an amount of transactions to be conducted using a point-of-sale (POS) device is expected to rise over a future time period; and
providing an option to a user of the POS device, at least partly in response to the determining, to increase a number of the transactions conducted during the future time period while the POS device is in the offline mode to increase the amount of transactions that the POS device is able to execute during the future time period,
wherein a transaction executed in the offline mode takes less time than a transaction executed in the online mode; and wherein the transaction executed in the POS device processes, based at least in part on the POS device switching to the online mode, the transaction executed in the online mode.

21. A POS device as recited in claim 20, the acts further comprising:

determining a rate at which transactions conducted using the POS device increased over the first time period; and
wherein the determining that the amount of transactions conducted using the POS device is expected to rise over the future time period is based least in part on determining that the rate has increase over the first time period.

22. A POS device as recited in claim 20, the acts further comprising:

determining a time of day;
determining that transactions conducted using the POS device have historically increased after the time of day; and
wherein the determining that the amount of transactions conducted using the POS device is expected to rise over the future time period is based least in part on determining that the transactions conducted using the POS device have historically increased after the time of day.

* * * * *